United States Patent Office 3,051,519
Patented Aug. 28, 1962

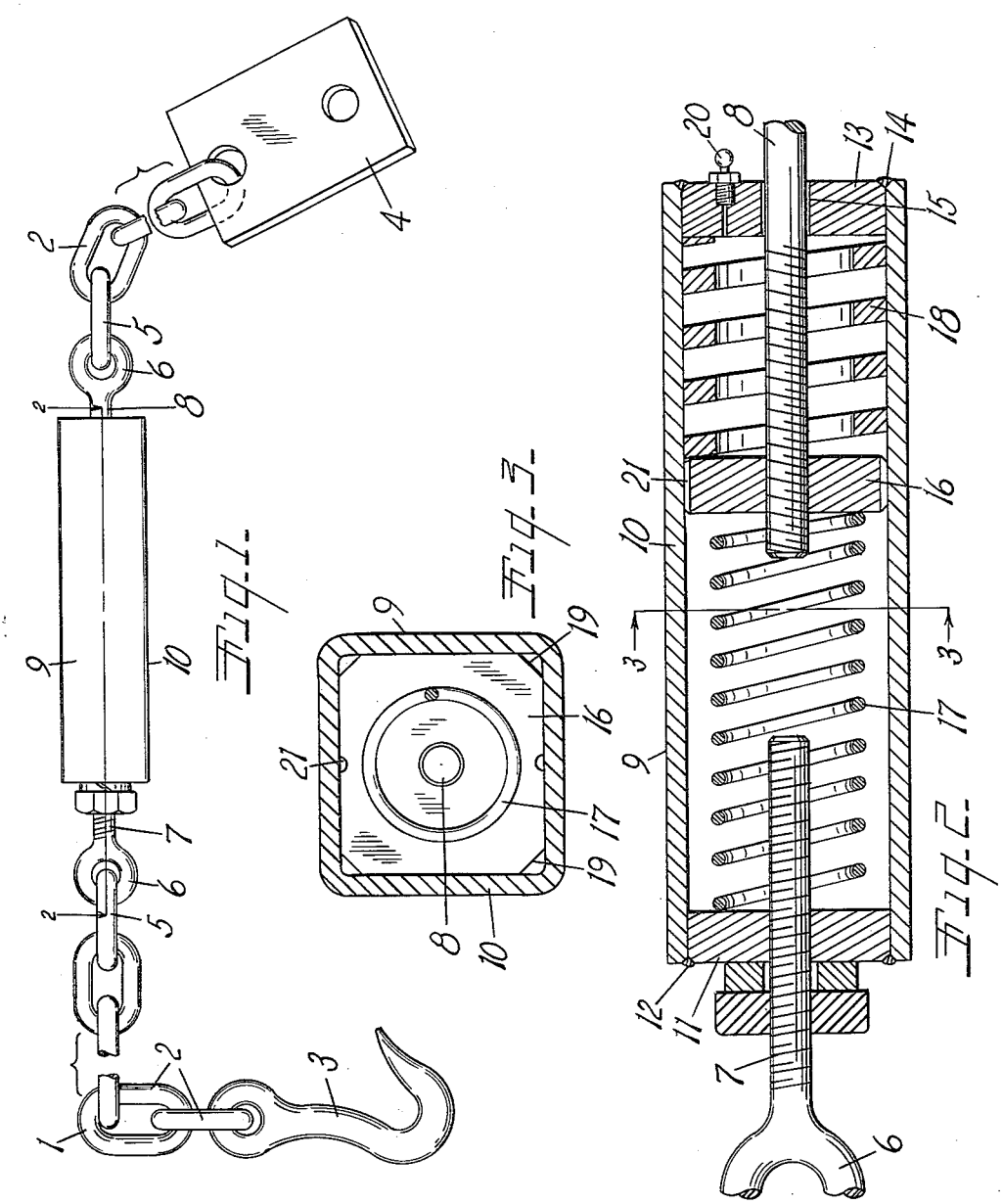

3,051,519
HOLD DOWN AND TOWING CHAIN WITH
TENSION CUSHIONING TURNBUCKLE
Stanley I. Sudeikis, Kalamazoo, Mich., assignor to Pilot
Distributing Company, Battle Creek, Mich.
Filed Feb. 13, 1961, Ser. No. 88,981
1 Claim. (Cl. 287—60)

This invention relates to improvements in hold down and towing chain with tension cushioning turnbuckle. The principal objects of this invention are:

First, to provide a chain with a turnbuckle therein which permits the chain to be positioned around a load or connected between two loads in a conventional manner and then tightened as with a turnbuckle to apply a yieldably cushioned tension force in the chain to take up slack or cushion shock forces which may thereafter be applied to the chain.

Second, to provide an improved form of turnbuckle usable in conjunction with a tension loaded chain or cable to apply a yieldable tension force in the chain or cable which can easily be adjusted.

Third, to provide a novel turnbuckle which encloses and protects its screw elements and a compression spring in a mass of lubricant to protect the parts under exposed conditions of use.

Fourth, to provide a turnbuckle that is easy to assemble, disassemble and adjust.

Other objects and advantages of the invention will be apparent from a consideration of the following description and claim. The drawings, of which there is one sheet, illustrate a highly practical form of the invention as incorporated into a chain.

FIG. 1 is a fragmentary elevational view of a towing or load binding chain with a turnbuckle embodying the features of the invention connected in the chain.

FIG. 2 is a fragmentary view taken longitudinally through the turnbuckle along the plane of the line 2—2 in FIG. 1.

FIG. 3 is a cross sectional view taken along the plane of the line 3—3 in FIG. 2.

The chain 1 considered as a towing or load binding element may be of any desired length, so the number of links 2 is unimportant. A hook 3 engageable over a selected link to form a loop is desirably provided on one end and a coupling element such as the flat apertured plate 4 may be attached to the other end of the chain for connection to a specialized abutment such as a draft bolt or clevis pin. Interior links 5—5 of the chain are linked to the eyes 6—6 of turnbuckle screws 7 and 8 of the turnbuckle 9.

The turnbuckle 9 consists of a tubular metal body 10 of rectangular or noncircular cross section. A first end wall 11 is welded in one end of the body as at 12 and drilled and tapped to receive the right hand thread on the shank of the turnbuckle screw 7. The other end of the body is closed by an end wall 13 welded in place as at 14. The wall 13 is drilled as at 15 to freely pass the shank of turnbuckle screw 8.

Before the last end wall 11 or 13 is secured in place, an interior nut 16 is positioned slidably but non-rotatably in the body 10 with a light coil spring 17 on one side and a heavy or stiff coil spring 18 on the other side bearing against the end wall 13. When the body 10 is square, the nut 16 is conveniently square with bevelled corners 19 to clear any inner radius in the body. The heavy spring 18 is conveniently made of bar stock of rectangular cross section coiled circularly to fit within the body. The spring 18 can be of any strength to cushion but not collapse completely under the expected loads to be applied thereto and is relatively unyielding to the pressure of the light spring 17. The unloaded length of the heavy spring 18 is such as to locate the nut 16 in spaced relation to each end of the body.

The light spring 17 holds the nut 16 against the heavy spring 18 so it is easy to pass the screw 8 through the aperture 15 and thread the screw into the nut 16. The screw 7 can obviously be threaded easily into the tapped hole in the end wall 11. The screws 7 and 8 are oppositely threaded right and left hand screws to provide a turnbuckle action when the screws are held by the chain 1 and the body 10 is rotated.

A grease fitting 20 threaded into the end wall 13 permits grease to be introduced into the body 10 under pressure. The grease will flow through the space formed by the notched corners 19 and grooves 21 formed in the sides of the interior nut 16 to completely fill the body and force out along the shanks of the screws 7 and 8. This excludes dirt and moisture and keeps the screws free turning. The turnbuckle is easy to adjust by hand by reason of its square shape, or a suitable wrench may be applied to the non-circular exterior of the body.

I have illustrated and described by invention in a highly practical embodiment thereof. I have not attempted to illustrate or describe other adaptations or embodiments which I contemplate, as I believe this disclosure will enable those skilled in the art to embody or adapt my invention as may be desired.

What is claimed as new is:

An elongated flexible towing and binding member having interior ends connected to oppositely threaded screws of a turnbuckle, said turnbuckle comprising a tubular body of noncircular cross section, end walls permanently and fixedly secured at each end of said body, one of said screws being threadedly engaged with one end wall, the other of said screws passing freely through the other end wall, an interior nut nonrotatably and slidably positioned in said body, said other screw being threadedly engaged with said interior nut, a relatively light spring bearing between said one end of said body and said nut, and a relatively heavy spring positioned between said nut and said other end wall, said heavy spring being substantially shorter than said body whereby said light spring holds said interior nut against the heavy spring in spaced relation to said end walls.

References Cited in the file of this patent
UNITED STATES PATENTS

| | | |
|---|---|---|
| 346,771 | Phillips | Aug. 3, 1886 |
| 1,006,950 | Keddy | Oct. 24, 1911 |
| 1,012,191 | Hubbard | Dec. 28, 1926 |
| 2,621,005 | Turpin | Dec. 9, 1952 |
| 2,648,997 | Sawyer | Aug. 18, 1953 |
| 2,816,783 | Robertson | Dec. 17, 1957 |